United States Patent [19]

Semmens

[11] Patent Number: 4,960,520

[45] Date of Patent: Oct. 2, 1990

[54] METHOD OF REMOVING ORGANIC VOLATILE AND SEMI-VOLATILE CONTAMINANTS FROM AN AQUEOUS SOLUTION

[75] Inventor: Michael J. Semmens, Minneapolis, Minn.

[73] Assignee: The Regents of the University of Minnesota, Minneapolis, Minn.

[21] Appl. No.: 380,003

[22] Filed: Jul. 14, 1989

[51] Int. Cl.⁵ .............................................. F01D 61/36
[52] U.S. Cl. ........................................ 210/640; 55/16
[58] Field of Search ........ 210/634, 640, 644, 649–654; 55/16, 158

[56] References Cited

U.S. PATENT DOCUMENTS 4,824,444  4/1989  Nomura ................................. 55/16

Primary Examiner—Frank Sever
Attorney, Agent, or Firm—Merchant, Gould, Smith, Edell, Welter & Schmidt

[57] ABSTRACT

Contaminated water is pumped through hollow fiber membranes of microporous polypropylene with a very thin outside coating of plasma polymerized disiloxane. The fibers are potted in a module which resembles a shell and tube heat exchanger. Strippant is pumped through the shell side of the module and over the outside of the fibers. The volatile and semi-volatile contaminants in the water diffuse across the membrane and dissolve into the oil. The process results in clean water and a smaller volume of more highly contaminated oil.

20 Claims, 2 Drawing Sheets

METHOD OF REMOVING ORGANIC VOLATILE AND SEMI-VOLATILE CONTAMINANTS FROM AN AQUEOUS SOLUTION

FIELD OF THE INVENTION

Broadly, my invention relates to methods of purifying water. In particular, my invention relates to methods of removing volatile contaminants from water. Specifically, my invention relates to methods of extracting volatile organic contaminants from water using a gas phase membrane.

BACKGROUND

Contamination of ground water by volatile and semi-volatile organic compounds is a widespread and well documented problem. Such contaminants enter the ground water from various sources such as underground storage tanks, municipal and industrial landfills, and industrial effluents. The contaminants may also enter the water as unintended by-product of conventional chemical treatment processes utilized to disinfect the water.

As the concentration of contaminants in ground water approach or exceed "acceptable levels", the contaminants must be removed to render the water potable. Hence, as the water supply used by a municipality and/or private well owner approaches the "acceptable level" for a contaminant, the municipality and/or private well owner must either accept the risk associated with such levels of contaminant, locate an alternative water source, or implement a treatment processes for removing the contaminant. Generally, treatment processes for removing contaminants from water are extremely expensive.

The most common method of removing contaminants from water is to contact the water with granular activated carbon. Treatment with activated carbon is generally the treatment of choice because it can readily remove a wide variety of typical contaminants. However, while activated carbon is effective at removing the less volatile contaminants such as PCBs, PAHs, and phenolics it is not particularly effective at removing the more volatile contaminants such as chloroform, 1,1,2-trichloroethane and trichloroethylene because of its low affinity for such contaminants. Hence, effective use of activated carbon to treat water contaminated with a volatile contaminant requires frequent replacement of the activated carbon to maintain optimum affinity of the activated carbon for the contaminant. Such frequent replacement of the activated carbon can significantly increases the cost of an already expensive process.

A second commonly employed method of removing contaminants from water is to pass the water through an air stripping tower. Basically, an air stripping tower removes contaminants from water by cascading the water over a packing material designed to uniformly disperse the water throughout the tower while providing an upward flow of air which is also designed to uniformly disperse the water throughout the tower as well as provide a supply of air into which the contaminants may dissipate. However, effective operation of air stripping towers is difficult as they are readily susceptible to flow channeling and flooding.

Contaminants may also be air stripped from water without encountering the flooding and flow channeling problems associated with air stripping towers by using a hollow fiber membrane contactor. Hollow fiber membrane contactors remove contaminants from water by passing the contaminated water through the lumen of microporous, hydrophobic, hollow fiber membranes while passing air over the outside of the hollow fiber membranes. The hydrophobic nature of the hollow fiber membranes retains the water within the lumen of the fiber while the fiber micropores permit diffusion of the contaminants through the fiber and into the air.

Air stripping is the treatment method of choice for removing volatile contaminants from water because of its relatively low cost. However, in order to prevent contamination of the atmosphere with the stripped contaminants it is typically necessary to recover the contaminant from the air prior to its release into the atmosphere and such secondary recovery can significantly increase the cost of the treatment. In addition, air stripping is not particularly effective at removing semivolatile and non-volatile contaminants as such contaminants are not readily volatilized from the water into the air.

The drawbacks associated with the processes commonly employed to remove contaminants from water has resulted in a continued need for an inexpensive alternative technique for achieving the effective removal of contaminants, particularly volatile contaminants, from groundwater.

SUMMARY OF THE INVENTION

I have discovered a method of efficiently removing an evaporable contaminant such as a volatile organic from an aqueous solution. My method removes the contaminant by transferring the contaminant to a stripping solvent such as a vegetable oil. The transfer is facilitated by a gas phase membrane located between the contaminated solution and the stripping solvent. The gas phase membrane permits effective diffusion of the contaminant from the contaminated solution to the stripping solvent while preventing direct contact between the contaminated solution and the stripping solvent.

A convenient method of providing the gas phase membrane between the contaminated solution and the stripping solvent is through the use of a structural membrane which is capable of trapping and maintaining a gas within its pores while in contact with the contaminated solution and the stripping solvent. The ability of the structural membrane to maintain the gas phase membrane is dependent upon the ability of the structural membrane to prevent the contaminated solution and the stripping solvent from wetting the membrane and displacing the gas. The structural membrane remains dry with its pores filled with air so that the only way that compounds can transfer across the membrane is by volatilization into the gas phase.

I believe that the evaporable contaminant is transferred from the contaminated solvent to the stripping solvent by (i) volatilization of the contaminant from the contaminated solvent into the gas phase membrane, (ii) diffusion of the contaminant through the gas phase membrane, and then (iii) diffusion of the contaminant from the gas phase membrane into the stripping solvent.

Definitions

As utilized herein, the term "microporous membrane" refers to membranes having an average pore size (diameter) of between about 0.01 to 0.1 $\mu$m.

As utilized herein, the term "evaporable contaminant" refers to undesired substances which have a Henry's constant (H) of greater than about 0.0005 at STP. Henry's constant is an experimentally derived dimensionless constant which represents the ratio of the equilibrium concentration of contaminant in the gas phase (air) to the corresponding equilibrium concentration of contaminant in the liquid phase (water).

As utilized herein, the term "volatile contaminant" refers to contaminants which have a Henry's constant (H) of greater than about 0.05 at STP. Examples of typical volatile contaminants are provided in Table A.

As utilized herein, the term "semi-volatile contaminant" refers to contaminants which have a Henry's constant (H) between about 0.05 and about 0.0005 at STP. Examples of typical semi-volatile contaminants are provided in Table A.

As utilized herein, the term "substantially nonvolatile contaminant" refers to contaminants which have a Henry's constant (H) of less than about 0.0005 at STP. Examples of typical non-volatile contaminants are provided in Table A.

As utilized herein, the terms "stripping solvent" and "strippant" refers to a liquid having a distribution constant ($K_D$) of greater than about 100 at STP. $K_D$ is an experimentally derived dimensionless constant which represents a ratio of the equilibrium concentration of contaminant in the stripping solvent phase to the corresponding equilibrium concentration of contaminant in the contaminated solution phase (water). The value of the distribution constant is dependent upon both the stripping liquid and the contaminant employed. Hence, a liquid may be classified as a "stripping solvent" for one contaminant but not for another.

As utilized herein, the term "gas phase membrane" refers to a membrane comprised of a gas which can separate two liquids.

As utilized herein, the term "substantially nonvolatile" when used in conjunction with a stripping solvent refers to a stripping solvent having a vapor pressure of less than about $10^{-2}$ mm Hg at 20° C.

As utilized herein, the term "oil" refers to the broad range of organic substances typically referred to as oils and includes mineral oils (petroleum and petroleum derived), vegetable/edible oils (linseed, soybean, coconut), and animal oils (fish oil, sperm oil).

As utilized herein, the term "edible oil" refers to oils which may be safely utilized in the preparation and manufacture of consumable foods.

Nomenclature a surface area to volume ratio ($L^2/L^3$)
C water phase solute concentration ($M/L^3$)
C* water phase concentration in equilibrium with oil phase ($M/L^3$).
d fiber diameter (L)
$d_e$ effective diameter outside of fibers calculated according to the equation
  4(L)(cross-sectional area)/(perimeter)
D module diameter (L)
$D_w$ diffusivity of solute in water phase ($L^2/t$)
$D_{air}$ diffusivity of solute in air phase ($L^2/t$)
$D_{oil}$ diffusivity of solute in oil phase ($L^2/t$)
H dimensionless Henry's Law constant
$K_D$ dimensionless ratio of equilibrium concentration of a solute in oil over that in water
$K_l$ overall mass transfer coefficient based on water phase (L/t)
$k_w$ individual mass transfer coefficient in water (L/t)
$k_{air}$ individual mass transfer coefficient in air (L/t)
$k_{oil}$ individual mass transfer coefficient in oil (L/t)
L fiber length (L)
n number of fibers
$Q_w$ water flow rate ($L^3/t$)
$Q_{oil}$ oil flow rate ($L^3/t$)
t time
$v_w$ velocity of water phase (L/t)
$v_{oil}$ velocity of oil phase (L/t)
$V_w$ water reservoir volume ($L^3$)
$V_{oil}$ oil reservoir volume ($L^3$)
X oil phase concentration ($M/L^3$)

DETAILED DESCRIPTION OF THE INVENTION

INCLUDING A BEST MODE

Figure 1:
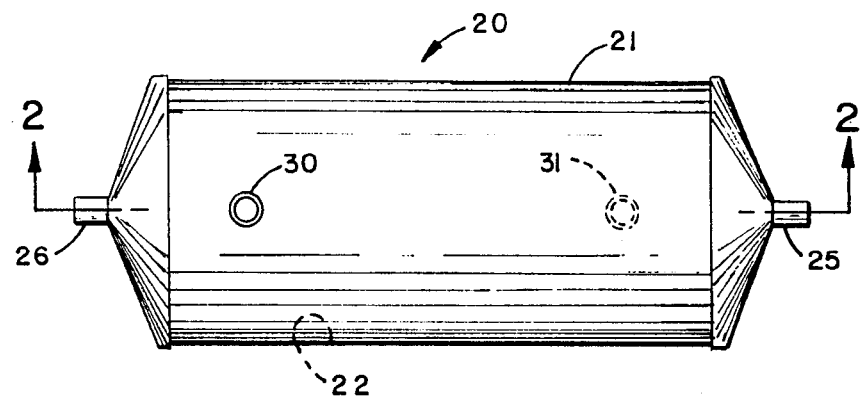
FIG. 1 is a side view of one embodiment of a diffusion module useful in practicing my invention.

My invention is directed to removing evaporable contaminants from an aqueous solution and transferring the removed contaminants to a stripping solvent. For convenience, the contaminated aqueous solution will hereinafter be referred to as contaminated water.

My invention is characterized by the utilization of a gas phase membrane which permits the evaporable contaminant to diffuse from the water through the gas phase membrane and into the strippant while avoiding direct contact between the water and the strippant. The strippant may be recovered for reuse by heat or vacuum distillation of the contaminants. Alternatively, the strippant may be treated in such a way as to oxidize or detoxify the contaminants before reuse.

The gas phase membrane is supported intermediate the water and strippant by a structural microporous membrane. The structural microporous membrane creates the gas phase membrane by retaining gas within its pores and preventing both the water and strippant from wetting the membrane and displacing the gas.

Contaminants

A list of typical environment contaminants is set forth in Table A along with the Henry's constant for each contaminant. The table includes a listing of volatile, semi-volatile and non-volatile contaminants.

TABLE A

| Compound | Formula | Henry's Constant (at 25° C.) |
|---|---|---|
| VOLATILE | | |
| Benzene | $C_6H_6$ | 0.2218 |
| Vinyl Chloride | $C_2H_5Cl$ | 44.85 at 10° C. |
| Trichloroethylene | $C_2HCl_3$ | 0.3852 at 20° C. |
| 1,1-Dichloroethylene | $C_2H_2Cl_2$ | 6.588 at 20° C. |
| Carbon Tetrachloride | $CCl_4$ | 0.9435 |
| Dichloromethane | $CH_2Cl_2$ | 0.1049 |
| SEMI-VOLATILE | | |
| Naphthalene | $C_{10}H_8$ | 0.0173 |
| Fluroene | $C_{13}H_9$ | 0.00343 |
| Phenanthrene | $C_{14}H_{14}$ | 0.0016 |
| Anthracene | $C_{14}H_{10}$ | 0.00242 |
| Biphenyl | $C_{12}H_{12}$ | 0.0113 |
| 1,1,2,2-Tetrachloroethane | $C_2H_2C_{14}$ | 0.0194 |
| 1,1,2-Trichloroethane | $C_2H_3Cl_3$ | 0.0484 |

TABLE A-continued

| Compound | Formula | Henry's Constant (at 25° C.) |
|---|---|---|
| DDT* | MW = 354.4 | 0.00214 |
| NON-VOLATILE | | |
| 3,4-Benzopyrene | $C_{20}H_{10}$ | $5.65 \times 10^{-8}$ |
| Parathion* | MW = 297.27 | $4.96 \times 10^{-5}$ |
| Methyl parathion* | MW = 263.18 | $8.07 \times 10^{-6}$ |
| Malathion* | MW = 330.36 | $1.53 \times 10^{-5}$ |
| Lindane* | MW = 290.83 | $1.29 \times 10^{-4}$ |
| Leptophos* | MW = 412.07 | $1.11 \times 10^{-4}$ at 20° C. |

*pesticides

The Stripping Solvent

Selection of a strippant is typically based upon the ability of the strippant to either (i) concentrate the contaminant for the purpose of facilitating the transportation, handling, storage and/or treatment of the contaminants, and/or (ii) provide performance characteristics which allow the contaminants to be more readily treated in another process.

A wide variety of strippants may be effectively employed in my invention. Selection of the most effective strippant depends upon the type and concentration of the contaminant(s) to be removed. The strippant should be substantially non-volatile in order to reduce diffusion of the strippant across the membrane and into the water. Strippants having a Henry's constant of less than about $10^{-6}$, and preferably less than about $10^{-10}$, may be conveniently employed in my invention. Stripping solvents having a Henry's constant in excess of about $10^{-6}$ may be employed in my invention provided that the resultant contamination of the water with the strippant does not adversely effect the intended use of the water. When the water is intended for use as potable water the stripping solvent is preferably non-toxic.

The strippant preferably has a high affinity for the contaminant(s) to be removed. Selection of a strippant having a high affinity for the contaminant(s) reduces the size of the apparatus necessary to achieve a given level of removal and results in a smaller volume of resultant contaminated strippant. Strippants having a $K_D$ of greater than about 100, and preferably greater than 400, with respect to the contaminated water are particularly well suited for use in my invention.

The strippant preferably has a low viscosity. The viscosity of the stripping solvent impacts upon the ability of the solvent to diffuse contaminants from the membrane/stripping solvent interface. As a general principle the lower the viscosity of the stripping solvent the higher the rate of diffusion of the contaminants from the gas phase membrane into the stripping solvent. The viscosity also impacts upon the ease with which the strippant may be pumped through the system. The higher the viscosity of the strippant the larger the pump required to provide a given flow rate. Solvents having a viscosity of less than about 1 centistoke are suitable for use in my invention. Solvents having a viscosity of less than about 0.6 centistoke are preferred.

Examples of suitable strippants include oils such as mineral oils (petroleum and petroleum derivatives), vegetable/edible oils and animal oils; alcohols such as decanol and dodecanol; and paraffins such as dodecane. Because of their relatively low cost, low volatility and high affinity for those volatile and semi-volatile organic contaminants commonly found in ground water, the oils are the strippants of choice. Typically useful oils include sunflower oil, safflower oil, corn oil, olive oil, linseed oil, soybean oil, coconut oil, fish oil and sperm oil. When the water is intended for use as potable water it is preferred to use edible oils.

The Diffusion Module

Figure 2:
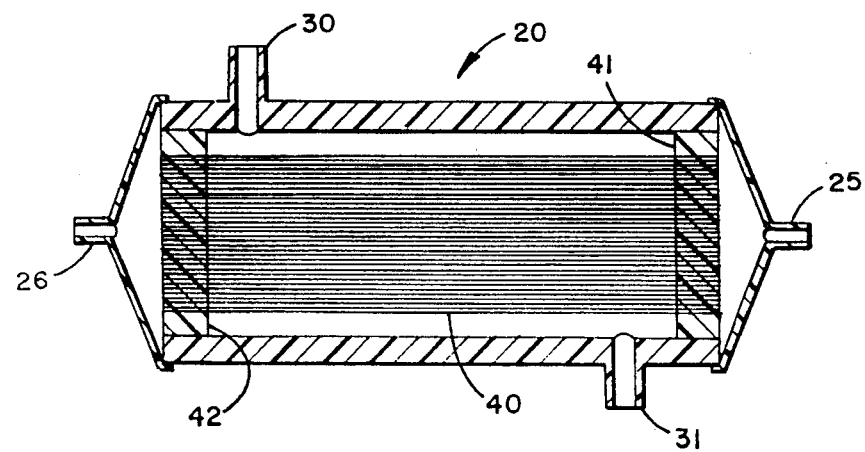
FIG. 2 is a cross-sectional view of the diffusion module depicted in FIG. 1 taken along line 2—2.

A wide variety of diffusion module designs may be utilized in association with the principles of the my invention. An exemplary design is illustrated in FIGS. 1 and 2.

A diffusion module for use in practicing my invention is generally characterized by the presence of two flow chambers, isolated from one another by a gas phase membrane. In preferred embodiments, each flow chamber comprises about 40–60% of the diffusion module. One of the flow chambers is appropriately designed for passage of the contaminated water while the other flow chamber is appropriately adapted for the passage of strippant. The gas phase membrane permits diffusion of the evaporable contaminant(s) across the membrane while preventing direct contact of the contaminated water and the strippant.

The gas phase membrane is supported between the contaminated water and the strippant by a structural membrane. The structural membrane provides pores within which the gas phase membrane may reside and prevents the contaminated water and the strippant from wetting the structural membrane and displacing the gas within the pores.

Figure 3:
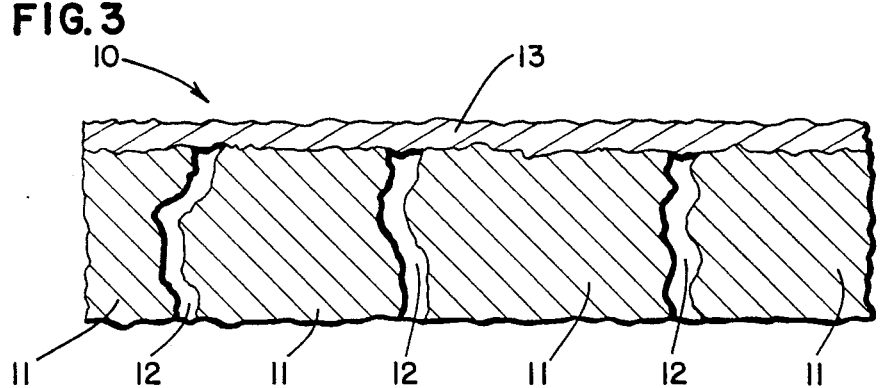
FIG. 3 is an enlarged cross-sectional side view of a thin film composite membrane useful in practicing my invention.

Referring to FIG. 3, the structural membrane comprises a thin film composite membrane 10 which includes a microporous membrane substrate 11 and a thin film coating 13. The microporous membrane substrate 11 includes micropores 12 which extend completely through the substrate 11.

The microporous membrane substrate 11 provides the pores which trap the gas between the contaminated water and the strippant and is constructed of a hydrophobic material in order to preventing the contaminated water from wetting the structural membrane. Hydrophobic materials suitable for use as the microporous membrane substrate 11 of my invention include polyolefins such as polyethylene, polypropylene, polybutylene, polytetrafluoroethylene, polyvinylchloride, polyvinylidene chloride, polystyrene, polyphenylene oxide, polysulfone, acrylonitrile-butadienestyrene terpolymer, styrene-acrylonitrile copolymer, styrene-butadiene copolymer, and poly(4-methyl-pentene-1).

An example of a useful polypropylene microporous hollow fiber membrane useable as the substrate in the diffusion module is Celgard ® X-20 (Questar, a Division of Hoechst-Celanese Corp., Charlotte, N.C. 28224). The material has a porosity of about 40%, an average pore size of 0.03–0.05 microns, a wall thickness of about 0.025 mm and an internal diameter of about 400 microns. A lower porosity fiber such as Celgard ® X-10 may also be useful. This fiber has a porosity of about 20%.

One side of the hydrophobic substrate 11 is coated with a material capable of preventing the stripping solvent from wetting the membrane. Such coated membranes are commonly referred to as thin film composite membranes. A detailed discussion of the manufacture and design of thin film composite membranes is provided in U.S. Pat. Nos. 4,410,338 and 4,824,444, the disclosures of which are hereby incorporated by reference. The siloxane coated thin film microporous membranes disclosed in U.S. Pat. No. 4,824,444 are suitable for use in my invention as they are capable of preventing a wide range of strippants including oils from wetting the membrane.

Support membranes having a porosity of from about 20% to about 80% may effectively be employed in my invention. Support membranes having a porosity of less than about 20% are ineffective at transferring evaporable contaminant due to the low surface area contact between the contaminated water and the gas phase membrane. Support membranes having a porosity in excess of about 80% provide excellent rates of transfer but are not suitable for use as they lack sufficient structural integrity to withstand the operating conditions of the diffusion module.

The support membrane should have a thickness sufficient to provide adequate structural integrity while minimizing the distance through which the contaminant(s) must diffuse in order to transfer from the contaminated water to the strippant. Support membranes having a thickness of about 0.01 to 0.1 mm typically provide an appropriate compromise between these competing interests. Support membranes having a thickness of about 0.01 to 0.03 mm are preferred. Support membranes having a thickness of less than about 0.1 mm typically do not affect the transfer rate of contaminant. The transfer rate for such membranes is controlled by the rate of transfer from the contaminated water to the gas phase membrane. However, when the membrane thicknesses approaches about 0.1 mm the rate of diffusion of the evaporable contaminants across the membrane begins to exceed the rate of transfer from the contaminated water to the gas phase membrane and can decrease the rate of diffusion of contaminant from the contaminated water to the strippant.

The average pore size and pore size distribution in the membrane substrate must be such that the substrate is capable of preventing the contaminated water from wetting the substrate while providing maximum surface area between the gas phase membrane and the contaminated water. Pore sizes within the microporous range are typically effective.

A preferred diffusion module structure for use in practicing my invention is illustrated in FIGS. 1 and 2. Referring to FIGS. 1 and 2, the module 20 includes an outer wall 21 which defines an internal volume 22. Internal volume 22 is divided into first and second flow chambers by numerous hollow fiber membranes 40 which are about 100 to 500 microns in diameter (OD). The hollow fiber membranes 40 are made from thin film composite membranes having the coating on the outside of the fibers and are employed to provide a gas phase membrane between the first and second flow channels.

The first flow chamber comprises the volume defined by the lumen of the hollow fiber membranes 40 and includes an inlet port 25 and an outlet port 26 for permitting the continuous flow of contaminated water through the first flow chamber. The second flow chamber comprises the volume between the module wall 21 and the outside of the hollow fiber membranes 40 and includes an inlet port 30 and an outlet port 31 for permitting the continuous flow of strippant through the second flow chamber.

The hollow fiber membranes 40 are mounted in module 20 by means of end caps 41 and 42 which may be formed from a suitable adhesive such as an epoxy. The end caps 41 and 42 provide separation between the first and second flow chambers.

In operation, the contaminated water is pumped under pressure through the first flow chamber simultaneously with pumping of the strippant through the second flow chamber. The contaminated water is forced through the lumen of the hollow fiber membranes 40 where the contaminant(s) in the solution diffuse from the solution into the gas phase membrane defined by the hollow fiber membranes 40. The contaminant(s) in the gas phase membrane then diffuse through the gas phase membrane to the outside of the hollow fiber membrane and finally into the strippant passing over the outside of the fibers 40.

Design of the hollow fiber membranes 40 must take into consideration the effects of average pore size, pore size distribution, porosity, and membrane thickness discussed earlier. Generally, fibers having an inside diameter of about 100 to 400 $\mu$m, an outside diameter of about 100 to 500 $\mu$m, and a wall thickness of about 10 to 50 $\mu$m, an average pore size of about 0.01 to about 0.1 $\mu$m, and a porosity of about 20% to about 80% are suitable.

Diffusion of the evaporable contaminants may be viewed as involving three general steps, (i) diffusion of the contaminants from the contaminated water to the surface of the gaseous phase membrane in contact with the contaminated water, (ii) diffusion of the contaminants across the gaseous phase membrane, and (iii) diffusion of the contaminants from the gaseous phase membrane into the stripping solution. Diffusion of the evaporable contaminants across the gas phase membrane is fairly rapid.

The overall efficiency of diffusion is generally related to the amount of surface area of the membrane available to transport. Thus, a module such as module 20 which includes a plurality of very small hollow fibers is preferred over a module including a single large tube because of the smaller fibers provide a larger surface area. For the same reasons, changes in the length of the hollow fiber membranes in contact with the stripping solvent can increase/decrease the resultant net transfer of contaminant.

The overall efficiency of diffusion is also temperature dependent. An increase in the overall efficiency of diffusion may be increased by increasing the temperature of the system.

The flow rates of the contaminated water and strippant may also be affect the overall efficiency of diffusion. A discussion of the effects of flow rate can be found in the Experimental section.

The coating on the membrane substrate must be sufficient to prevent the strippant from wetting the membrane without significantly interfering with diffusion of the contaminant(s). Without intending to be limited thereby, it is believed that the coating actually extends over the pores in the substrate such that the contaminant(s) must permeate and pass through the coating in order to contact the strippant.

EXPERIMENTAL

Apparatus and Testing Method

Into a first stoppered Erlenmeyer flask equipped with a thermometer, a sampling syringe, inlet and outlet tubes and an air driven magnetic stirrer was placed a volume of water containing approximately 1 mg/1 of each of the volatile organic contaminants listed in Table A. The contaminants were selected on the basis of their environmental significance and the wide range of their Henry's constants. The contaminants were obtained in analytical grade form from Chem Service, Inc. of West Chester, Pa. and were used as received.

resistant to the rate of organic transfer and may be ignored. Thus, the mass transfer can be expressed in terms of direct transfer between the water and oil. The

TABLE A

| Contaminant | Partition Coefficient | | $D_{air}$ | Diffusivities (m²/s) | |
| --- | --- | --- | --- | --- | --- |
| | KD | H | | $D_{water}$ | $D_{oil}$ |
| Chloroform | 100 | 0.124 | $9.02 \times 10^{-6}$ | $10.1 \times 10^{-10}$ | $1.01 \times 10^{-10}$ |
| 1,1,2-trichloroethane | 142 | 0.032 | $8.11 \times 10^{-6}$ | $8.83 \times 10^{-10}$ | $0.89 \times 10^{-10}$ |
| trichloroethylene | 413 | 0.327 | $8.26 \times 10^{-6}$ | $9.63 \times 10^{-10}$ | $0.97 \times 10^{-10}$ |
| carbon tetrachloride | 867 | 0.985 | $8.12 \times 10^{-6}$ | $9.19 \times 10^{-10}$ | $0.92 \times 10^{-10}$ |
| tetrachloroethylene | 2576 | 0.594 | $7.54 \times 10^{-6}$ | $8.90 \times 10^{-10}$ | $0.90 \times 10^{-10}$ |

Into a second stoppered Erlenmeyer flask equipped with inlet and outlet tubes and an air driven magnetic stirrer was placed a quantity of sunflower oil as a strippant for the contaminants.

The contaminated water was circulated from the first Erlenmeyer flask by means of a recirculating pump (model RPG-400 available from Fluid Metering, Inc. of NJ) through the lumen of a hollow fiber membrane diffusion module (available from Applied Membrane Technologies of Minneapolis, Minn. and then returned to the first Erlenmeyer flask.

In conjunction with the flow of contaminated water, the sunflower oil was circulated from the second Erlenmeyer flask by means of a second RPG-400 recirculating pump through the shell of the diffusion module and back to the second Erlenmeyer flask.

The shell of the diffusion module was constructed of aluminum and had an inside diameter of 1.7 cm. The diffusion chamber was packed with 1880 polypropylene hollow fiber membranes modified with an outer coating of plasma polymerized disiloxane. The hollow fiber membranes had an inner diameter of 200 μm, an outer diameter of 250 μm, an effective length of 7.62 cm and an average pore size of approximately 0.03 μm. The diffusion module had a packing density of 0.41.

0.8 ml samples of the contaminated water were withdrawn from the first Erlenmeyer flask through the syringe at timed intervals. The samples were immediately extracted in an equal volume of pentane (available from Burdick & Jackson, distilled in glass), spiked with an internal standard of 1,2-dichloroethane (available from Aldrich Chemical Co., Milwaukee, WI) and then analyzed on a Hewlett Packard 5840A gas chromatograph equipped with a capillary column and an electron capture detector. The data obtained from this system is set forth in Table C.

Theory

The transport of volatile organics from the water phase inside the fiber lumen through the air filled membrane pores and into the oil phase flowing over the exterior of the fibers proceeds in response to a concentration gradient between the three phases involved. Equilibrium between the water and air phases is described by a Henry's Law constant which represents the ratio of the equilibrium concentration present in the air phase over the corresponding equilibrium concentration in the aqueous phase. Equilibrium between the water and oil phases is described by an oil/water partition coefficient ($K_D$) which represents the ratio of the equilibrium concentration present in the oil phase to the corresponding equilibrium concentration in the water phase. Earlier work has shown that transport of the volatile organics across the air filled membrane pores is sufficiently rapid that it does not contribute a significant resistance to the rate of organic transfer and may be ignored. Thus, the mass transfer can be expressed in terms of direct transfer between the water and oil. The strippant/water partition coefficient ($K_D$) is the ratio of the equilibrium oil phase concentration (X) over the equilibrium water phase concentration $C^*$. Thus, $$K_D = X/C^* \quad \text{Equation (1)}$$

The value of $C^*$ may be tracked through the fiber by measuring the concentration of the volatile organic contaminant in the water and performing a mass balance for the oil and water streams. In a like manner, the concentrations of volatile organic contaminant in the oil and water reservoirs may be determined from overall mass balances. Thus the change in the volatile organics concentration in the water reservoir can be determined from the equation:

$$C_1/C_0 = \frac{\exp\left[(Q_w t/V_w)\left(\frac{(1 - \exp[D(A - 1)])(1 + B)}{A \exp[D(A - 1)] - 1}\right)\right] + B}{(1 + B)} \quad \text{Equation (2)}$$

where:
$A = Q_w/K_D Q_{oil}$
$B = V_w/K_D V_{oil}$
$D = K_L aL/v_w = 4K_L L/v_w d$ To extract mass transfer coefficients from the experimental data, Equation 2 can be rearranged to yield an expression for the overall mass transfer coefficient ($K_L$):

$$K_L = \frac{(Q_w Q_{oil} K_D)(\text{Ln}[(F + V_w V_{oil} K_D Q_{oil} k)/(F + V_w V_{oil} Q_w k)])}{(\pi n d L(Q_w - K_D Q_{oil}))} \quad \text{Equation (3)}$$

where:
$F = Q_{oil} Q_w (V_w + V_{oil} K_D)$
$k = \ln[(1+B)(C_1/C_0) - B]/t$

Each of the values necessary for the determination of $K_L$ were measured directly by experimentation. The value of k in Equation 3 was obtained from the slope of line generated by plotting $\ln[(1+B)(C_1/C_0) - B]$ (the numerator in the expression for k) as the ordinate axis against time as the abscissa. The remaining values needed to solve for $K_L$ are constants for any given experimental setup. In this manner, mass transfer coefficients were measured for each volatile organic contaminant under each of the various operating conditions studied. The overall mass transfer coefficients were evaluated by monitoring the rate of removal of the volatile organics from the water reservoir. The analysis involves mass balances on the oil and water streams together with the rate of volatile organic contaminant transfer across the membrane fibers.

Results and Discussion

The concentrations of the volatile organics in the water reservoir were monitored with respect to time by use of a gas chromatograph. The exemplary data presented in Table C illustrates the effective removal of the tested volatile contaminants by the oil strippant.

Parameters manipulated in the experiment included the water flow rate, oil flow rate, oil volume, and the oil/water partition coefficient. Mass transfer coefficients were calculated from the experimental data using Equation 3. The data revealed that extraction of volatile compounds from water in the experimental system occurs in a predictable manner.

The data revealed an increase in mass transfer rates with increasing water flow rate (constant oil flow rate). This indicated that transfer of the volatile contaminants from the bulk water phase to the membrane surface controls the overall mass transfer rate.

An increase in mass transfer rate was also observed with increasing oil flow rate (constant water flow rate) for those volatile compounds displaying the least affinity for the stripping oil such as chloroform. This trend of increasing mass transfer coefficient with increasing oil flow rate was not observed for tetrachloroethylene which displays the highest affinity for the stripping oil (high $K_D$) of the solutes tested. In fact, the magnitude of the effect of oil flow rate on the rate of mass transfer decreased predictably with increasing $K_D$ values. This relationship suggests that transfer of the solutes from the membrane into the bulk oil phase also exerts a control on the mass transfer rate which is inversely proportional to the partition coefficient. Thus compounds with a lower affinity for the oil phase experience co-control of mass transfer by both the water and oil phases. Since the rates of diffusion of the various solutes in the stripping oil are quite similar, as shown in Table 1, it is believed that the controlling factor is the carrying capacity of the oil film layer in contact with the membrane surface.

Based upon the earlier work which shows that the gas phase membrane does not contribute a significant resistance to the transport of volatile organics, it is believed that the system can satisfactorily remove semi-volatile as well as volatile contaminants. Semi-volatile contaminants will tend to increase the resistance attributed to the gas phase membrane, but such resistance will not significantly affect nor control the rate of transfer until the resistance approaches the resistance attributed to the water/gas and gas/strippant interfaces.

The volume of oil recirculated through the module on the exterior of the fibers was varied from 25 to 100 milliliters. No change in the rate of solute transfer could be observed. The relatively low solute concentration in the oil phase explains this behavior. The bulk carrying capacity of the oil is not challenged at the solute concentrations used here, thus the oil volume cannot be expected to be a limiting factor.

The rate of transfer in the membrane/oil system can be as high as that found in hollow fiber membrane air stripping when the oil phase resistance is minimized, such as for compounds displaying a high $K_D$ value. This has been shown to be significantly higher than that possible in packed tower aeration. Even compounds experiencing co-control by both water and oil phases have a higher rate of transfer than can be obtained by established aeration methods.

Since the oil contains volatile compounds there is no release of these contaminants to the atmosphere which gives the process an advantage over air stripping. With oil recovery the volatile organic contaminants are condensed to a very small volume or oxidized. The device is also adaptable to the small scale user. A homeowner for example could use a small module to treat his contaminated well water.

A major advantage of my system is that the system will remove semi-volatile contaminants such as phenanthrene PCB's etc. just as effectively as highly volatile contaminants such as trichloroethylene. Thus the system appears to overcome some of the disadvantages of conventional air stripping and granular activated carbon.

TABLE C

| Run | T (°C.) | Vw (ml) | Voil (ml) | Qw (ml/min) | Qoil (ml/min) |
|---|---|---|---|---|---|
| 11 | 23–26.6 | 250 | 50 | 103 | 35 |
| 12 | 22.3–24.2 | 250 | 50 | 16 | 35 |
| 13 | 22.5–25.2 | 250 | 50 | 61 | 35 |
| 14 | 22.4–26.2 | 250 | 50 | 103 | 14 |
| 16 | 24.8–29.6 | 250 | 50 | 103 | 40.5 |
| 17 | 22.7–27.5 | 250 | 25 | 103 | 35 |
| 18 | 23.4–27.5 | 250 | 100 | 103 | 35 |
| 19 | 22.6–25.8 | 250 | 50 | 103 | 1.8 |
| 20 | 23.9–26.5 | 250 | 50 | 103 | 3.1 |
| 21 | 22–27.7 | 250 | 50 | 8 | 35 |
| 23 | 22.2–24.4 | 250 | 50 | 35 | 35 |
| 24 | NR | 250 | 50 | 103 | 35 |
| 25 | NR | 250 | 50 | 103 | 35 |
| 26 | NR | 250 | 50 | 33 | 35 |
| 27 | NR | 250 | 50 | 33 | 35 |
| 28 | NR | 250 | 50 | 125 | 35 |
| 29 | NR | 250 | 50 | 195 | 35 |
| 30 | NR | 250 | 50 | 326 | 35 |
| 32 | NR | 250 | 50 | 470 | 35 |
| 33 | NR | 250 | NA | 125 | NA |
| 34 | NR | 250 | NA | 195 | NA |
| 35 | NR | 250 | NA | 326 | NA |

TABLE C

RUN 11
WATER RESERVOIR CONCENTRATION/TIME
[Concentration = gas chromatograph area count]

| Time (min) | CHCl$_3$ | C$_2$H$_3$Cl$_3$ | C$_2$HCl$_3$ | C$_2$Cl$_4$ | CCl$_4$ |
|---|---|---|---|---|---|
| 25 | 8657 | 2733 | 1951 | 2598 | 1593 |
| 20 | 9838 | 4324 | 2730 | 3051 | 2553 |
| 15 | 11247 | 6284 | 3973 | 3877 | 4062 |
| 10 | 14426 | 13264 | 7533 | 5157 | 9491 |
| 5.4 | 16149 | 21442 | 10962 | 6390 | 17769 |
| 0 | 22525 | 55128 | 22889 | 9165 | 50015 |

TABLE C

RUN 12
WATER RESERVOIR CONCENTRATION/TIME
[Concentration = gas chromatograph area count]

| Time (min) | CHCl$_3$ | C$_2$H$_3$Cl$_3$ | C$_2$HCl$_3$ | C$_2$Cl$_4$ | CCl$_4$ |
|---|---|---|---|---|---|
| 25.5 | 15706 | 11558 | 9630 | 6486 | 11375 |
| 20 | 17260 | 16758 | 11882 | 6882 | 16836 |
| 15 | 18897 | 21440 | 14081 | 7218 | 21766 |
| 10 | 19757 | 24732 | 15807 | 7569 | 26212 |
| 5 | 20960 | 30634 | 18433 | 8334 | 33341 |
| 0 | 22710 | 39741 | 22469 | 9598 | 45381 |

TABLE C

RUN 13
WATER RESERVOIR CONCENTRATION/TIME
[Concentration = gas chromatograph area count]

| Time (min) | CHCl$_3$ | C$_2$H$_3$Cl$_3$ | C$_2$HCl$_3$ | C$_2$Cl$_4$ | CCl$_4$ |
|---|---|---|---|---|---|
| 25 | 10572 | 3439 | 3454 | 3811 | 2692 |
| 20 | 12422 | 5732 | 4990 | 4494 | 4763 |
| 15 | 14418 | 9202 | 7307 | 5422 | 8317 |
| 10 | 15844 | 12595 | 9533 | 6355 | 12311 |
| 5 | 19107 | 21581 | 14573 | 7488 | 22862 |
| 0 | 22796 | 35265 | 21822 | 9276 | 39896 |

TABLE C

RUN 14
WATER RESERVOIR CONCENTRATION/TIME
[Concentration = gas chromatograph area count]

| Time (min) | CHCl$_3$ | C$_2$H$_3$Cl$_3$ | C$_2$HCl$_3$ | C$_2$Cl$_4$ | CCl$_4$ |
|---|---|---|---|---|---|
| 25 | 10215 | 3375 | 2683 | 3220 | 1846 |
| 20 | 12260 | 6129 | 3987 | 3700 | 3503 |
| 15 | 14122 | 10852 | 5972 | 4809 | 6299 |
| 10 | 16750 | 18085 | 9217 | 5720 | 11949 |
| 5 | 19679 | 30510 | 14577 | 7333 | 24635 |
| 0 | 25283 | 70249 | 27014 | 9795 | 61355 |

TABLE C

RUN 16
WATER RESERVOIR CONCENTRATION/TIME
[Concentration = gas chromatograph area count]

| Time (min) | CHCl$_3$ | C$_2$H$_3$Cl$_3$ | C$_2$HCl$_3$ | C$_2$Cl$_4$ | CCl$_4$ |
|---|---|---|---|---|---|
| 25 | 6893 | 2025 | 1353 | 1545 | 1080 |
| 20 | 7965 | 2818 | 2057 | 2174 | 1683 |
| 15 | 9213 | 3827 | 3019 | 2715 | 2516 |
| 10 | 11390 | 6387 | 5082 | 3664 | 4856 |
| 5 | 13582 | 11141 | 8600 | 4972 | 9904 |
| 0 | 19038 | 27708 | 18526 | 7411 | 28476 |

TABLE C

RUN 17
WATER RESERVOIR CONCENTRATION/TIME
[Concentration = gas chromatograph area count]

| Time (min) | CHCl$_3$ | C$_2$H$_3$Cl$_3$ | C$_2$HCl$_3$ | C$_2$Cl$_4$ | CCl$_4$ |
|---|---|---|---|---|---|
| 25 | 6616 | 1105 | 1267 | 2034 | 663 |
| 20 | 7933 | 2065 | 2017 | 2460 | 1361 |
| 15 | 8994 | 2764 | 2914 | 3109 | 2082 |
| 10 | 10987 | 5172 | 5103 | 4193 | 4811 |
| 5 | 12885 | 8032 | 7768 | 5115 | 8668 |
| 0 | 16604 | 16873 | 14748 | 6961 | 21565 |

TABLE C

RUN 18
WATER RESERVOIR CONCENTRATION/TIME
[Concentration = gas chromatograph area count]

| Time (min) | CHCl$_3$ | C$_2$H$_3$Cl$_3$ | C$_2$HCl$_3$ | C$_2$Cl$_4$ | CCl$_4$ |
|---|---|---|---|---|---|
| 25 | 6015 | 1369 | 1301 | 1786 | 714 |
| 20 | 7070 | 2326 | 1950 | 2290 | 1463 |
| 15 | 8371 | 3603 | 2906 | 2689 | 2313 |
| 10 | 10092 | 5921 | 4679 | 3367 | 4415 |
| 5 | 11294 | 8815 | 6893 | 4295 | 7965 |
| 0 | 15686 | 22610 | 14797 | 6113 | 23028 |

TABLE C

RUN 19
WATER RESERVOIR CONCENTRATION/TIME
[Concentration = gas chromatograph area count]

| Time (min) | CHCl$_3$ | C$_2$H$_3$Cl$_3$ | C$_2$HCl$_3$ | C$_2$Cl$_4$ | CCl$_4$ |
|---|---|---|---|---|---|
| 25 | 3856 | 919 | 829 | 1176 | 510 |
| 20 | 4182 | 1200 | 1116 | 1442 | 799 |
| 15 | 4701 | 1606 | 1489 | 1670 | 1152 |
| 10 | 5244 | 2377 | 2187 | 2026 | 2058 |
| 5.3 | 5906 | 3452 | 3277 | 2556 | 3863 |
| 0 | 8050 | 8662 | 7328 | 3929 | 11476 |

TABLE C

RUN 20
WATER RESERVOIR CONCENTRATION/TIME
[Concentration = gas chromatograph area count]

| Time (min) | CHCl$_3$ | C$_2$H$_3$Cl$_3$ | C$_2$HCl$_3$ | C$_2$Cl$_4$ | CCl$_4$ |
|---|---|---|---|---|---|
| 25 | 1554 | 661 | 932 | 1663 | 445 |
| 20 | 4846 | 1085 | 1327 | 1875 | 849 |
| 15 | 5436 | 1587 | 1819 | 2184 | 1366 |
| 10 | 6257 | 2557 | 2884 | 2775 | 2660 |
| 5 | 7535 | 4455 | 4756 | 3340 | 5561 |
| 0 | 9624 | 8943 | 9877 | 4606 | 13444 |

TABLE C

RUN 21
WATER RESERVOIR CONCENTRATION/TIME
[Concentration = gas chromatograph area count]

| Time (min) | CHCl$_3$ | C$_2$H$_3$Cl$_3$ | C$_2$HCl$_3$ | C$_2$Cl$_4$ | CCl$_4$ |
|---|---|---|---|---|---|
| 25 | 11734 | 8354 | 8416 | 5114 | 10848 |
| 15 | 11732 | 9029 | 8959 | 5304 | 12106 |
| 10 | 12240 | 10705 | 10528 | 6068 | 15673 |
| 5.3 | 12761 | 11520 | 11245 | 6292 | 16919 |
| 0 | 13155 | 12300 | 11876 | 6594 | 17834 |

TABLE C

RUN 23
WATER RESERVOIR CONCENTRATION/TIME
[Concentration = gas chromatograph area count]

| Time (min) | CHCl$_3$ | C$_2$H$_3$Cl$_3$ | C$_2$HCl$_3$ | C$_2$Cl$_4$ | CCl$_4$ |
|---|---|---|---|---|---|
| 25 | 7855 | 4642 | 3883 | 3032 | 4202 |
| 20 | 8375 | 5486 | 4567 | 3248 | 5145 |
| 15 | 9398 | 7043 | 6000 | 3885 | 7272 |
| 10 | 10443 | 9730 | 7929 | 4514 | 10904 |
| 5 | 14497 | 12728 | 9988 | 5111 | 15439 |
| 0 | 13048 | 18361 | 13528 | 6062 | 23311 |

TABLE C

RUN 26
WATER RESERVOIR CONCENTRATION/TIME
[Concentration = gas chromatograph area count]

| Time (min) | CHCl$_3$ | C$_2$H$_3$Cl$_3$ | C$_2$HCl$_3$ | C$_2$Cl$_4$ | CCl$_4$ |
|---|---|---|---|---|---|
| 25 | 10527 | 6516 | 5278 | 3859 | 5315 |
| 20 | 11519 | 8248 | 6628 | 4506 | 7251 |
| 15 | 12472 | 9481 | 7700 | 4924 | 8954 |
| 10 | 13222 | 12597 | 9737 | 5542 | 12822 |
| 5 | 14630 | 16353 | 12229 | 6059 | 17876 |
| 0 | 16310 | 22938 | 16110 | 7215 | 26470 |

TABLE C
RUN 27
WATER RESERVOIR CONCENTRATION/TIME
[Concentration = gas chromatograph area count]

| Time (min) | $CHCl_3$ | $C_2H_3Cl_3$ | $C_2HCl_3$ | $C_2Cl_4$ | $CCl_4$ |
|---|---|---|---|---|---|
| 25 | 14203 | 5551 | 5958 | 5682 | 5955 |
| 20 | 14359 | 8036 | 7575 | 5732 | 7848 |
| 15 | 15746 | 10643 | 9563 | 6248 | 10902 |
| 10 | 17057 | 13024 | 11606 | 6973 | 14390 |
| 5 | 18654 | 18907 | 15606 | 8212 | 22792 |
| 0 | 21135 | 24843 | 20062 | 9136 | 31534 |

TABLE C
RUN 28
WATER RESERVOIR CONCENTRATION/TIME
[Concentration = gas chromatograph area count]

| Time (min) | $CHCl_3$ | $C_2H_3Cl_3$ | $C_2HCl_3$ | $C_2Cl_4$ | $CCl_4$ |
|---|---|---|---|---|---|
| 20 | 6600 | 1268 | 921 | 1436 | ERR |
| 16 | 6853 | 1322 | 963 | 1521 | 404 |
| 12 | 7840 | 2020 | 1349 | 1904 | 823 |
| 8 | 8617 | 2914 | 1842 | 2270 | 1677 |
| 4 | 10237 | 4895 | 3083 | 3069 | 4115 |
| 0 | 11541 | 8225 | 4932 | 3814 | 8218 |

TABLE C
RUN 29
WATER RESERVOIR CONCENTRATION/TIME
[Concentration = gas chromatograph area count]

| Time (min) | $CHCl_3$ | $C_2H_3Cl_3$ | $C_2HCl_3$ | $C_2Cl_4$ | $CCl_4$ |
|---|---|---|---|---|---|
| 25.5 | 9174 | 1716 | 1346 | 1995 | 581 |
| 12 | 10376 | 2312 | 1686 | 2384 | 824 |
| 8 | 11664 | 3468 | 2478 | 3219 | 1885 |
| 4 | 13381 | 5486 | 3738 | 3917 | 4326 |
| 0 | 18856 | 14461 | 8925 | 6388 | 15113 |

TABLE C
RUN 30
WATER RESERVOIR CONCENTRATION/TIME
[Concentration = gas chromatograph area count]

| Time (min) | $CHCl_3$ | $C_2H_3Cl_3$ | $C_2HCl_3$ | $C_2Cl_4$ | $CCl_4$ |
|---|---|---|---|---|---|
| 25.5 | **** | **** | **** | **** | **** |
| 16 | 7387 | 1377 | 991 | 1312 | **** |
| 12 | 8122 | 1813 | 1307 | 1801 | 583 |
| 8 | 8969 | 2480 | 1677 | 2278 | 1038 |
| 4 | 10901 | 4439 | 2770 | 2941 | 2861 |
| 0 | 15535 | 15896 | 8123 | 5094 | 15935 |

TABLE C
Overall Mass Transfer Coefficient [$K_L \cdot 10^5$] (Observed)

| Run | $CHCl_3$ | $C_2H_3Cl_3$ | $C_2HCl_3$ | $C_2Cl_4$ | $CCl_4$ |
|---|---|---|---|---|---|
| 11 | 0.578 | 0.523 | 0.109 | 0.158 | 0.136 |
| 12 | 0.195 | 0.154 | 0.413 | 0.098 | 0.767 |
| 13 | 0.042 | 0.036 | 0.817 | 0.131 | 0.108 |
| 14 | 0.498 | 0.453 | 0.988 | 0.158 | 0.133 |
| 16 | 0.608 | 0.063 | 0.115 | 0.189 | 0.147 |
| 17 | 0.565 | 0.053 | 0.112 | 0.159 | 0.119 |
| 18 | 0.518 | 0.472 | 0.101 | 0.149 | 0.115 |
| 19 | 0.422 | 0.477 | 0.915 | 0.177 | 0.091 |
| 20 | 0.477 | 0.041 | 0.975 | 0.159 | 0.111 |
| 21 | 0.019 | 0.126 | 0.187 | 0.342 | 0.217 |
| 23 | 0.282 | 0.003 | 0.059 | 0.905 | 0.663 |
| 24 | | | | | |
| 25 | | | | | |
| 26 | 0.227 | 0.245 | 0.498 | 0.803 | 0.578 |
| 27 | 0.216 | 0.208 | 0.563 | 0.088 | 0.725 |
| 28 | 0.538 | 0.585 | 1.222 | 0.226 | 0.125 |

TABLE C-continued
Overall Mass Transfer Coefficient [$K_L \cdot 10^5$] (Observed)

| Run | $CHCl_3$ | $C_2H_3Cl_3$ | $C_2HCl_3$ | $C_2Cl_4$ | $CCl_4$ |
|---|---|---|---|---|---|
| 29 | 0.673 | 0.071 | 0.138 | 0.268 | 0.132 |
| 30 | 0.703 | 0.008 | 0.144 | 0.286 | 0.151 |
| 32 | 0.558 | 0.818 | 0.018 | 0.358 | 0.022 |
| 33 | 0.151 | 0.115 | 0.208 | 0.305 | 0.187 |
| 34 | 0.156 | 0.114 | 0.241 | 0.041 | 0.258 |
| 35 | 0.185 | 0.129 | 0.305 | 0.428 | 0.263 |

I claim:

1. A method of transferring an evaporable contaminant from an aqueous solution to a nonaqueous stripping solvent comprising the step of transporting the contaminant from the aqueous solution in a gas and/or vapor phase to the stripping solvent through a gas phase membrane sufficient for contaminant to be transferred without substantial direct contact between the solvents.

2. The method of claim 1 wherein a ratio of the equilibrium concentration of the contaminant in the stripping solvent and the corresponding equilibrium concentration of the contaminant in the contaminated solution at STP is at least 100.

3. The method of claim 1 wherein a ratio of the equilibrium concentration of the contaminant in the stripping solvent and the corresponding equilibrium concentration of the contaminant in the contaminated solution at STP is at least 400.

4. The method of claim 1 wherein the stripping solvent is a substantially nonvolatile oil.

5. The method of claim 4 wherein the oil is an edible oil.

6. The method of claim 4 wherein the oil has a viscosity of less than about 1 centistoke.

7. The method of claim 4 wherein the oil has a viscosity of less than about 0.8 centistokes.

8. The method of claim 1 wherein the contaminant is a volatile contaminant.

9. A method of transferring an evaporable contaminant from an aqueous solution to a nonaqueous stripping solvent, comprising the steps of:
   (a) obtaining a structural membrane capable of supporting a gas phase membrane between the contaminated aqueous solution and the nonaqueous stripping solvent, and
   (b) diffusing the evaporable contaminant from the contaminated solution in a gas and/or vapor phase to the stripping solvent through the gas phase membrane without substantial direct contact between the contaminated solution and the stripping solvent.

10. The method of claim 9 wherein the structural membrane comprises a substrate capable of preventing substantial wetting of the structural membrane by the aqueous contaminated solution and a coating on the substrate capable of preventing substantial wetting of the structural membrane by the nonaqueous stripping solvent.

11. The method of claim 10 wherein the structural membrane comprises a laminate of a microporous hydrophobic material which is wettable by the nonaqueous stripping solvent and a material capable of preventing substantial wetting of the structural membrane by the nonaqueous stripping solvent.

12. The method of claim 11 wherein the hydrophobic material is a polyolefin.

13. The method of claim 11 wherein the material capable of preventing substantial wetting of the structural membrane by the nonaqueous stripping solvent is a polymerized siloxane.

14. The method of claim 11 wherein the microporous hydrophobic layer of the structural membrane has an average pore diameter of about 0.01 to 0.1 $\mu$m.

15. The method of claim 11 wherein the microporous hydrophobic layer of the structural membrane has a porosity of about 20% to about 80%.

16. The method of claim 10 wherein the structural membrane is configured and arranged into a hollow fiber membrane with the coating exterior to the substrate.

17. The method of claim 16 further comprising the step of inducing flow of the contaminated solution through the lumen of the hollow fiber membranes and inducing flow of the stripping solvent over the outside of the hollow fiber membranes.

18. The method of claim 10 further comprising the step of inducing flow of the contaminated solution past the layer capable of preventing substantial wetting of the structural membrane by the contaminated solution and inducing flow of the stripping solvent past the layer capable of preventing substantial wetting of the structural membrane by the nonaqueous stripping solvent.

19. The method of claim 9 wherein the structural membrane is configured and arranged into a hollow fiber membrane having a lumen.

20. The method of claim 19 wherein the hollow fiber membrane has an inside diameter of about 100 to 400 $\mu$m, an outside diameter of about 100 to 500 $\mu$m, and a wall thickness of about 10 to 50 $\mu$m.

* * * * *

UNITED STATES PATENT AND TRADEMARK OFFICE
CERTIFICATE OF CORRECTION

PATENT NO.   :   4,960,520

DATED        :   October 2, 1990

INVENTOR(S)  :   Michael J. Semmens

It is certified that error appears in the above-identified patent and that said Letters Patent is hereby corrected as shown below:

In column 1, line 52,
  please delete "increases" and substitute therefore--increase--

In column 2, line 17 and 18,
  please delete "semivolatile" and substitute therefore--semi-volatile--

In column 2, line 18,
  please delete "non-volatile" and substitute therefore--nonvolatile--

In column 3, line 19,
  please delete "non-volatile" and substitute therefore--nonvolatile--

In column 4, line 51,
  please delete "non-volatile" and substitute therefore--nonvolatile In column 5, line 5,
  please delete "MW=354.4" and substitute therefore--MW=354.5--

In column 5, line 6,
  please delete "Non-Volatile" and substitute therefore--Nonvolatile--

In column 5, line 26,
  please delete "non-volatile" and substitute therefore--nonvolatile--

In column 5, line 36,
please delete "non-toxic" and substitute therefore--nontoxic--

UNITED STATES PATENT AND TRADEMARK OFFICE
CERTIFICATE OF CORRECTION

PATENT NO. : 4,960,520

DATED : October 2, 1990

INVENTOR(S) : Michael J. Semmens

It is certified that error appears in the above-identified patent and that said Letters Patent is hereby corrected as shown below:

In column 6, line 39,
  please delete "preventing" and substitute therefore --prevent--

In column 8, line 38,
  please delete "of" after the word because

In column 8, line 48,
  please delete "be" after the word also

In column 9, line 23,
  please insert --)-- after Minn.

In column 10, line 32,
  please delete "Cl/Co="

In column 10, line 36,
  please insert --Cl/Co=--

In column 10, line 47,
  please delete "KL="

In column 10, line 49,
  please insert --KL=--

In column 10, line 35,
  Brackets on patent should not be extended to include the A exp quotation

UNITED STATES PATENT AND TRADEMARK OFFICE
CERTIFICATE OF CORRECTION

PATENT NO. : 4,960,520

DATED : October 2, 1990

INVENTOR(S) : Michael J. Semmens

It is certified that error appears in the above-identified patent and that said Letters Patent is hereby corrected as shown below:

In column 12, line 22,
  please delete "Run"

In column 12, line 21,
  please insert--Run--

In column 12, line 22,
  please delete "." after ($^{\circ}$C)

In column 13, RUN 17, line 51,
  please delete "4193" and substitute therefore--4192--

In column 15, RUN 27, line 11,
  please delete "8212" and substitute therefore--8242--

In column 15, Overall Mass, line 64,
  please delete "282" and substitute therefore--283--

Signed and Sealed this

Twenty-eighth Day of July, 1992

Attest:

DOUGLAS B. COMER

*Attesting Officer*   *Acting Commissioner of Patents and Trademarks*